United States Patent
Kotzin et al.

Patent Number: 5,822,699
Date of Patent: *Oct. 13, 1998

[54] METHOD AND APPARATUS FOR MAINTAINING CALL IN A COMMUNICATION SYSTEM

[75] Inventors: Michael D. Kotzin, Buffalo Grove; Jeffrey D. Bonta, Arlington Heights, both of Ill.

[73] Assignee: Motorola, Inc., Schaumburg, Ill.

[*] Notice: The term of this patent shall not extend beyond the expiration date of Pat. No. 5,594,946.

[21] Appl. No.: 926,248

[22] Filed: Sep. 5, 1997

Related U.S. Application Data

[63] Continuation-in-part of Ser. No. 594,048, Jan. 30, 1996, abandoned.

[51] Int. Cl.⁶ .................................................. H04Q 7/20
[52] U.S. Cl. ...................... 455/447; 455/450; 455/62; 455/63
[58] Field of Search .................................. 455/422, 436, 455/437, 438, 446, 447, 450, 451, 452, 62, 63, 524, 525, 67.1, 67.3

[56] References Cited

U.S. PATENT DOCUMENTS

| | | | |
|---|---|---|---|
| 5,038,399 | 8/1991 | Bruckert | 455/54.1 |
| 5,148,548 | 9/1992 | Meche et al. | 455/63 |
| 5,319,796 | 6/1994 | Grube et al. | 455/63 |
| 5,594,946 | 1/1997 | Menich et al. | 455/63 |

FOREIGN PATENT DOCUMENTS 63-245025  10/1988  Japan ........................ 455/63

*Primary Examiner*—Nguyen Vo
*Attorney, Agent, or Firm*—Kenneth A. Haas

[57] ABSTRACT

A method of maintaining call quality in a communication system by communicating between a base site (101) and a communication unit (113) on a first channel. The communication unit (113) monitors the downlink communication signal (116) transmitted by the base site (101) and determines a characteristic of the first channel. The communication unit (113) is then handed off to a second channel having a less aggressive reuse pattern, based on the characteristic of the first channel.

12 Claims, 6 Drawing Sheets

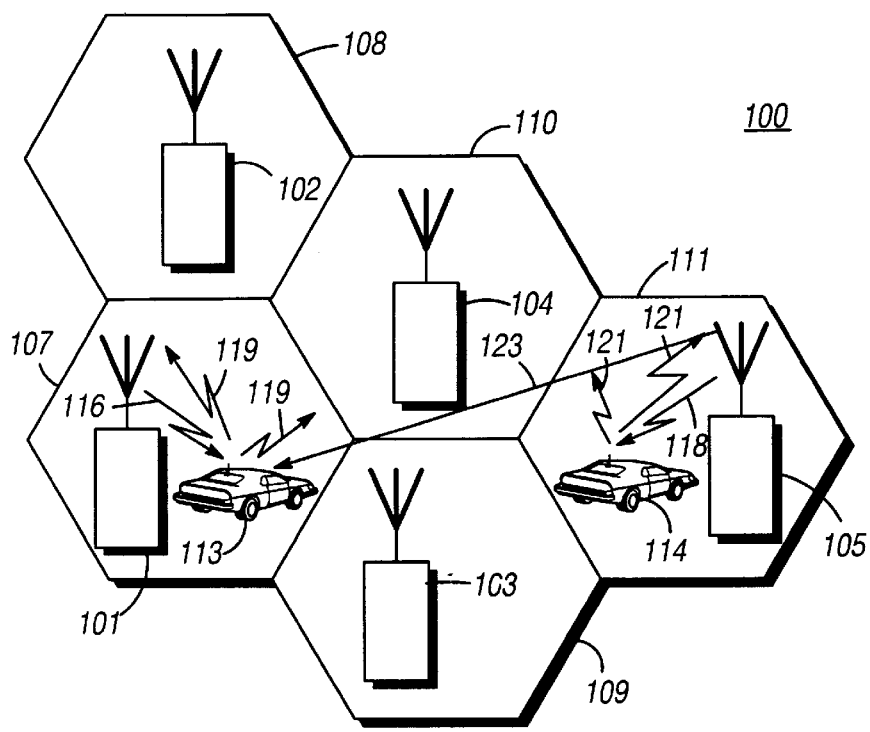
FIG.1
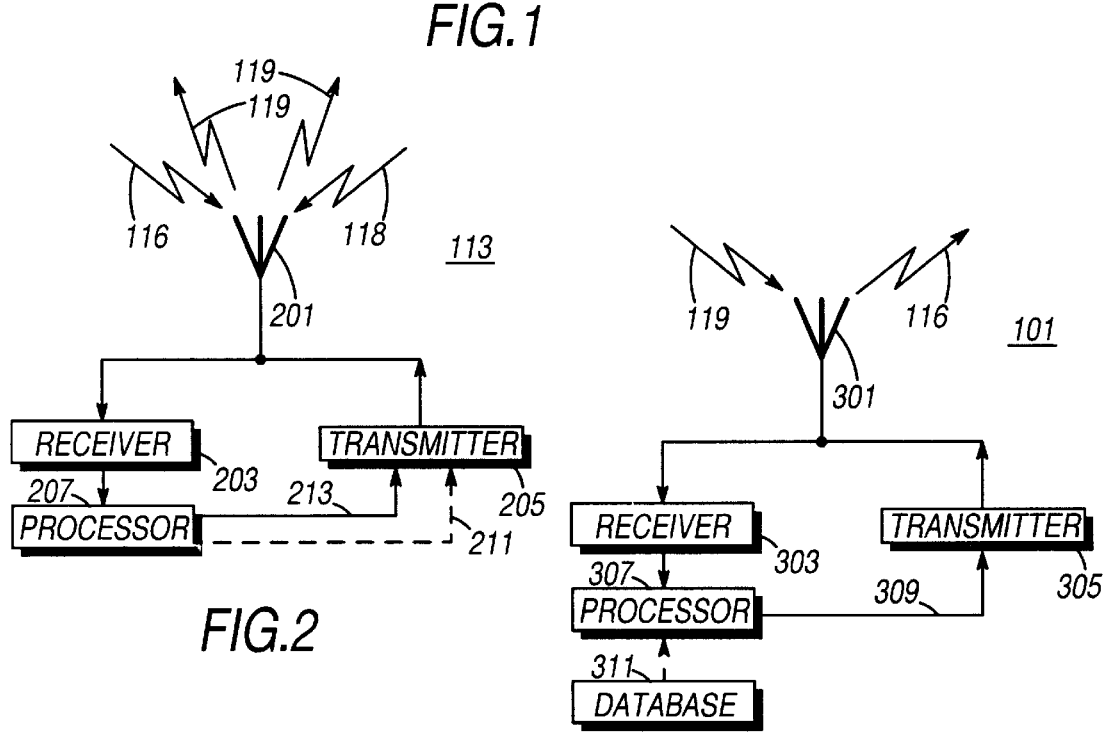
FIG.2
FIG.3 ated Jan. 30, 1996 and now abandoned.
METHOD AND APPARATUS FOR MAINTAINING CALL IN A COMMUNICATION SYSTEM This is a continuation of application Ser. No. 08/594, 048,filed Jan. 30, 1996 and now abandoned.

FIELD OF THE INVENTION

The present invention relates generally to mitigating interference in a communication system and, in particular, to maintaining call quality in a communication system.

BACKGROUND OF THE INVENTION

Communication systems are known to comprise a plurality of base sites that provide communication services to communication units located in corresponding service coverage areas of the base sites. One known communication system is a cellular communication system, such as the Global System for Mobile Communications (GSM). In the GSM system, a communication unit (e.g., a mobile or portable radiotelephone) that desires to communicate sends a channel request signal to a base site serving the coverage area in which the communication unit resides. Upon receiving the channel request signal, the serving base site allocates a communication resource for the communication. The communication resource comprises a coordinated pair of time slots and frequencies (i.e., a first time slot at an uplink frequency and a second time slot at a downlink frequency). The time slot at the uplink frequency supports transmissions from the communication unit to the serving base site; whereas, the time slot at the downlink frequency supports transmissions from the serving base site to the communication unit.

Upon allocating the communication resource, the base site sends a channel designation signal to the communication unit via a common control channel. The channel designation signal contains the uplink time slot and frequency, the downlink time slot and frequency, and the transmit power for the communication unit. Upon receiving the channel designation signal, the communication unit tunes its transmitter and receiver to the designated time slots and frequencies and begins communicating with a telephone network subscriber or another communication unit via the serving base site.

During a typical communication, the communication unit moves throughout the coverage area of the serving base site and the serving base site monitors a signal quality metric (e.g., received signal strength indication (RSSI)) of the communication unit's uplink communication signal. To account for changes in RSSI as the communication unit moves, the serving base site will issue commands directing the communication unit to increase or decrease the communication unit's transmit power as the need arises.

Typically, as the communication unit moves to the periphery of the serving base site coverage area, the transmit power of the communication unit as well as the transmit power of the base site must be increased to account for an increase in path losses between the serving base site and the communication unit. This increased transmit power has the potential to interfere with an uplink/downlink communication signal at the same, or an adjacent, uplink/downlink frequency being used in another base site coverage area. That is, the higher power transmission of the communication unit and base site can increase the cochannel or adjacent channel interference in the other coverage area as viewed by the communication unit or base site serving that coverage area.

A known technique for mitigating the increased cochannel and adjacent channel interference introduced by an interfering communication unit is to reassign, or hand-off, the communication unit that is being interfered with. This technique is described in detail in GSM Recommendation 05.08. Although this technique can adequately mitigate the effect of interference, the communication unit causing the interference will continue to be a potential interferer with any uplink/downlink communication signals at the same, or an adjacent, uplink/downlink frequencies assigned in other base site coverage areas.

Therefore, a need exists for a method and apparatus for mitigating interference produced by a communication unit that will lessen the chance that the communication unit will continue to be a potential interferer.

BRIEF DESCRIPTION OF THE DRAWINGS

FIG. 1 illustrates a communication system in accordance with a preferred embodiment of the present invention.

FIG. 2 illustrates a block diagram of a communication unit in accordance with a preferred embodiment of the present invention.

FIG. 3 illustrates a block diagram of a base site in accordance with a preferred embodiment of the present invention.

DESCRIPTION OF A PREFERRED EMBODIMENT

Figure 4:
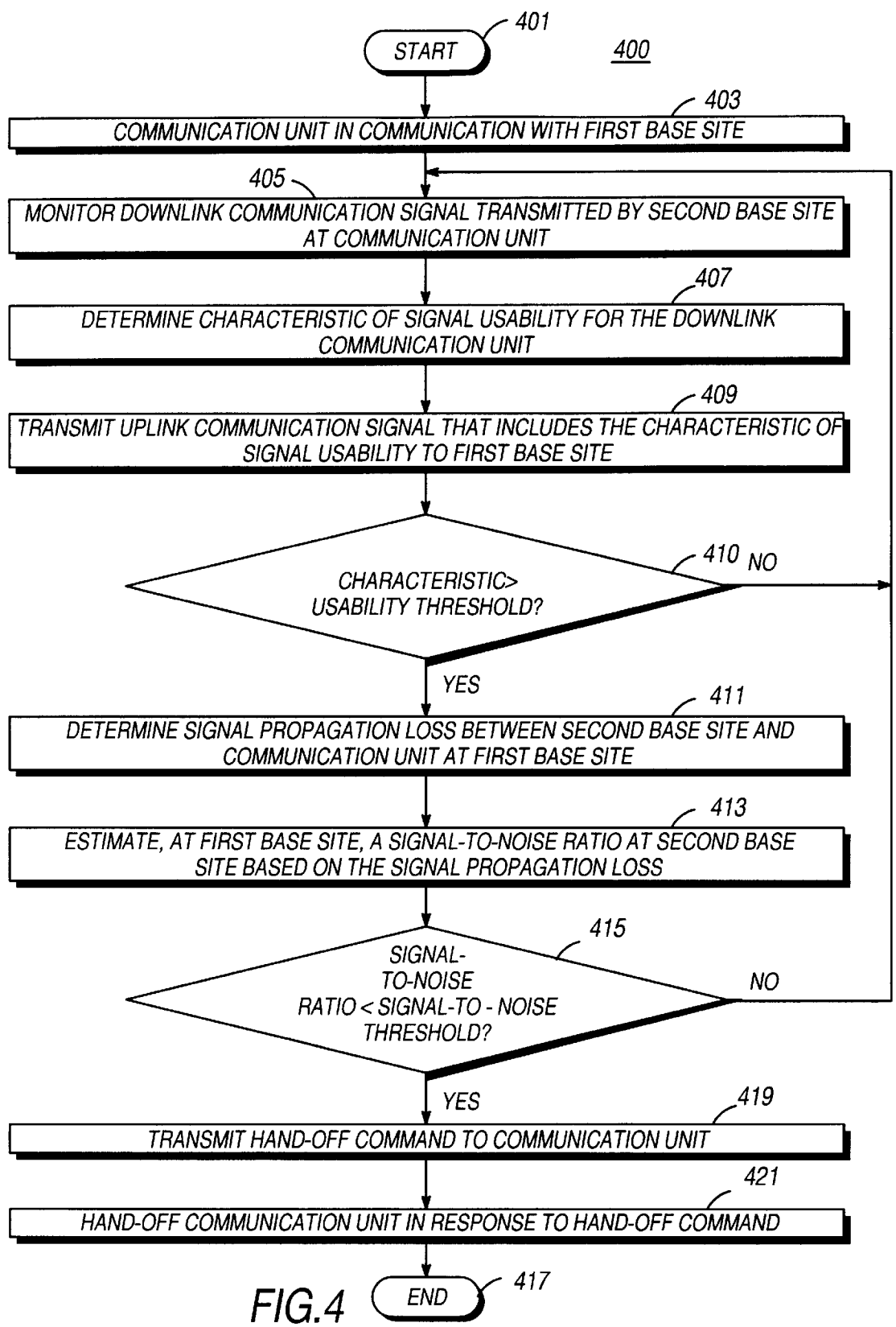
FIG. 4 illustrates a logic flow diagram of steps executed by a base site and a communication unit in accordance with a preferred embodiment of the present invention.

The present invention lessens the chance that a communication unit will continue to be a potential interferer by communicating between a base site and a communication unit on a first channel. The communication unit monitors the downlink communication signal transmitted by the base site and determines a characteristic of the first channel. The communication unit is then handed off to a second channel having a less aggressive reuse pattern, based on the characteristic of the first channel.

Generally, the present invention encompasses communicating between a first site and a communication unit on a first channel, where the first channel is associated with a first group of channels. Next, the communication unit monitors a second channel transmitted from a second site and determines a characteristic of the second channel. Finally, the communication unit is transferred to a third channel based on the characteristic of the second channel, where the third channel associated with a second group of channels having a less aggressive reuse pattern than the first group of channels.

In an alternative embodiment, the invention encompasses communicating between a first base site and a mobile unit on a first channel, where the first channel resides in a first group of channels. Next, the base site monitors a second channel transmitted from a second base site, where the second channel resides in the first group of channels. Next, the base site determines a characteristic of the second channel and finally hands off the mobile unit to a third channel based on the characteristic of the second channel, where the third channel resides in a second group of channels said second group of channels having a less aggressive reuse pattern than the first group of channels.

The present invention can be more fully described with reference to FIGS. 1–7 wherein like numerals designate like components. FIG. 1 illustrates a communication system 100 in accordance with a preferred embodiment of the present invention. The communication system 100 includes a plurality of base sites 101–105 having respective service coverage areas 107–111 and a plurality of communication units 113 and 114. As shown, communication unit 113 is communicating with base site 101 via uplink communication signal 119 and base site 101 is communicating with communication unit 113 via downlink communication signal 116. Similarly, communication unit 114 is communicating with base site 105 via uplink communication signal 121 and base site 105 is communicating with communication unit 114 via downlink communication signal 118. In a preferred embodiment, the communication system 100 may, for example, be an analog or digital cellular communication system, such as the Advanced Mobile Phone Service (AMPS) system, the Personal Digital Cellular (PDC) system, or the United States Digital Cellular (USDC) (GSM, USDC and AMPS systems are described in Electronic Industries Association/Telecommunications Association Industry Interim Standard 54 (IS-54). An exemplary communication unit (e.g., 113) and an exemplary base site (e.g., 101) are described in detail below with regard to FIGS. 2 and 3, respectively.

Operation of the communication system 100 in accordance with a preferred embodiment of the present invention occurs as follows. Communication unit 113, while communicating with serving base site 101, monitors a downlink communication signal 118 transmitted by a distant base site 105. In the preferred embodiment, the distant base site 105 is assigned to receive uplink traffic channel frequencies that are either identical to, or adjacent to, the uplink traffic channel frequencies assigned for reception by the serving base site 101. The downlink communication signal 118 preferably is a control signal that includes the identity of the distant base site 105. The communication unit 113 then determines a characteristic of signal usability for the downlink communication signal 118. In a preferred embodiment this characteristic is a received signal strength indication (RSSI) determined from monitoring the control channel of the distant base site 105. However, in an alternate embodiment the characteristic might be related to a bit error rate (BER), a frame erasure rate (FER), a carrier to interference ratio (C/I), or a carrier to noise ratio (C/N). In addition, the downlink characteristic of signal usability for the serving cell traffic channel frequency 116 comprising a received signal strength indication (RSSI), or a bit error rate (BER), a frame erasure rate (FER), a carrier to interference ratio (C/I), or a carrier to noise ratio (C/N) is also determined by the communication unit 113. The communication unit 113 transmits the characteristic of signal usability (e.g., RSSI) to the serving base site 101 via the uplink communication signal 119.

The serving base site 101 receives the uplink communication signal 119 and compares the characteristic of signal usability to a usability threshold for the distant base site 105. In the preferred embodiment, the usability threshold is the RSSI level that corresponds to an undesired path loss between the communication unit 113 and the distant base site 105 or the desired path loss between the communication unit 113 and the serving base site 101. When the characteristic of signal usability exceeds the threshold, the serving base site 101 estimates a signal-to-noise ratio, as viewed by the distant base site 105, for the uplink communication signal 121 transmitted by the communication unit 114 being served by the distant base site 105.

The signal-to-noise ratio is estimated by first determining a signal propagation loss (i.e., path loss) between the distant base site 105 and the communication unit 113 over the path 123 therebetween. In this estimation, the "noise" effectively is the level of cochannel or adjacent channel interference produced by the interfering communication unit 113. In the preferred embodiment, the serving base site 101 determines the signal propagation loss by subtracting the RSSI measurement (in decibel units) of the distant base site 105 contained in the uplink communication signal 119 received from the interfering communication unit 113 from the transmitted power (in decibel units) of the distant base site 105. The serving base site 101 then determines the signal power of the uplink communication signal 119 (i.e., the "noise") incident upon the distant base site 105 by adding the signal propagation loss to the transmit power of the interfering communication unit 113. In the preferred embodiment, the serving base site 101 includes a database that contains the transmit powers of the other base sites 102–105 and the transmit powers of active communication units (e.g., 113) in its service coverage area 107 in accordance with conventional hand-off and uplink signal power control techniques. In addition, the base site database preferably includes uplink power control parameters (e.g., desired uplink RSSI) for the other base stations 102–105. Thus, the serving base site 101 knows the desired RSSI level at which the distant base site 105 intends to receive an uplink communication signal 121 from a communication unit 114 in the distant base site's service coverage area 111.

After computing the noise (N) incident upon the distant base site 105 and retrieving the desired RSSI level (S) for an uplink communication signal 121 intended for reception by the distant base site 105, the serving base site 101 estimates the signal-to-noise ratio for the intended uplink communication signal 121 at the distant base site 105 by subtracting the signal power of the interfering uplink communication signal 119 from the desired RSSI level of the intended uplink communication signal 121. The computation of the signal-to-noise ratio in decibels (dB) is summarized by the following equation:

$$S/N_{ds} \text{ (dB)} = \text{desired } RSSI_{ds} - [P_{Tint} - (P_{Tds} - RSSI_{int})]$$

where $S/N_{ds}$ is the signal-to-noise ratio for a particular uplink communication signal 121 as perceived by the distant base site 105, desired $RSSI_{ds}$ is the desired RSSI level at the distant base site 105 for the particular uplink communication signal 121, $P_{Tint}$ is the transmit power of the interfering communication unit 113, $(P_{Tds} - RSSI_{int})$ is the signal propagation loss between the distant base site 105 and the interfering communication unit 113 (i.e., transmit power of the distant base site $(PT_{ds})$ less RSSI at the interfering communication unit 113 $(RSSI_{int})$). One of ordinary skill in the art will appreciate that the parameter $RSSI_{int}$ is the same parameter measured by communication units in communication systems that employ mobile assisted hand-off (MAHO).

Upon estimating the signal-to-noise ratio at the distant base site 105, the serving base site 101 compares the signal-to-noise ratio to a signal-to-noise threshold. When the signal-to-noise ratio is below the signal-to-noise threshold (e.g., 13 dB in the GSM system), the serving base site 101 transmits a channel designation signal (hand-off command) to the interfering communication unit 113 that directs the interfering communication unit 113 to hand-off to an uplink/downlink channel having a less aggressive reuse pattern, thereby reducing the interference produced by the interfering communication unit 113 as perceived by the distant base site 105. Additionally, by handing off the communication unit 113 to a channel that is not utilized by base site 105, the possibility that the new channel assigned to communication unit 113 will continue to interfere with base site 105 is further reduced. Further details of handing off to channels having less aggressive reuse patterns is discussed below in reference to FIG. 8.

FIG. 2 illustrates a communication unit (e.g., 113) in accordance with a preferred embodiment of the present invention. The communication unit 113 comprises, an antenna 201, a receiver 203, a transmitter 205, and a processor 207. The receiver 203 preferably comprises well known front-end and backend circuitry, such as downconverters, mixers, filters, demodulators, and analog to-digital converters that produce a baseband representation of the received downlink communication signal 116. The transmitter 205 preferably comprises mixers, amplifiers, attenuators, and modulation circuitry. The processor 207 preferably comprises a digital signal processor (DSP) or a microprocessor.

In a preferred embodiment, the communication unit 113 receives the downlink communication signals 116, 118 from the serving base site 101 and the distant base site 105, respectively, via the antenna 201. The downlink communication signal 118 received from the distant base site 105 is processed by the receiver 203 to determine a characteristic of signal usability for the downlink communication signal 118. In a preferred embodiment, the characteristic of signal usability is an RSSI. The RSSI is provided to the processor 207 where, in a preferred embodiment, the RSSI is configured within a transmit baseband signal 213. The transmit baseband signal 213 is provided to the transmitter 205 for transmission to the serving base site 101. The transmitter 205 transmits the RSSI to the serving base site 101 via the uplink communication signal 119.

When the communication unit 113 receives a downlink communication signal 116 from the serving base site 101, the received signal is processed by the receiver 203 to extract the transmitted baseband information, including a hand-off command and uplink/downlink channels when sent. The receiver 203 provides the baseband information to the processor 207. The processor 207 interprets the hand-off command and generates a hand-off signal 211 that directs the transmitter 205 to hand-off to the assigned uplink/downlink channels. In the preferred embodiment the transmitter 205 is handed off to an uplink/downlink channel that is on a less aggressive reuse pattern, thereby lessening the chance that the communication unit 113 will continue to be a potential interferer to the communication unit 114.

In a first alternative embodiment, when the communication unit 113 receives the downlink communication signal 118 from the distant base site 105, the processor 207 might additionally compare the received RSSI to a usability threshold to determine whether or not to include the RSSI within the transmit baseband signal 213 and to transmit the RSSI to the serving base site 101. The usability threshold is the same threshold as would be used at the serving base site 101 (e.g., 13 dB for a GSM system). When the processor 207 determines that the received RSSI exceeds the usability threshold, the processor generates the transmit baseband signal 213, including the RSSI, and forwards the transmit baseband signal 213 to the transmitter 205 for transmission to the serving base site 101. Thus, in this embodiment, the communication unit 113 performs a preliminary evaluation of the usability of the downlink signal 118 received from the distant base site 105. With this approach the serving base site 101, or some other means, must provide the usability threshold to the communication unit 113. For example, the serving base site 101 might transmit a list of usability thresholds for various alternate base sites 102–105 to the communication unit 113 as part of the control information transmitted during the call set-up procedure.

In a second embodiment, the communication unit 113 might receive a downlink communication signal 116 from the serving base site 101 that includes the pertinent information (e.g., transmit power of the distant base site 105, the desired uplink RSSI at the distant base site 105, and the signal-to-noise threshold) that the serving base site 101 uses in the preferred embodiment to estimate the signal-to-noise ratio for the uplink communication signal 121 at the distant base site 105. In this embodiment, when the communication unit 113 receives the downlink communication signal 118 from the distant base site 105, the processor 207 compares the received RSSI to the usability threshold. When the received RSSI exceeds the usability threshold, the communication unit 113 estimates the signal-to-noise ratio for the uplink communication signal 121 at the distant base site 105. The processor 207 then compares the estimated signal-to-noise ratio with the signal-to-noise threshold. When the estimated signal-to-noise ratio is below the signal-to-noise threshold, the communication unit 113 transmits a request to the serving base site 101 to be handed off to an uplink/downlink channel having a less aggressive reuse pattern, thereby reducing the interference produced by the interfering communication unit 113 as perceived by the distant base site 105. With this approach the communication unit 113 would require additional memory and processing capabilities to be able to perform the signal-to-noise computations for all the base sites with which it may be interfering.

In yet a third alternative embodiment, the communication unit 113 monitors a characteristic of the of the downlink communication signal 116 transmitted by the serving base site 101. In the preferred embodiment this characteristic comprises a received signal strength indication (RSSI), however, one of ordinary skill in the art will recognize that other characteristics (bit error rate (BER), a frame erasure rate (FER), a carrier to interference ratio (C/I), or a carrier to noise ratio (C/N)) may be utilized as well. Next, the communication unit 113 compares the RSSI to a threshold. If it is determined that the RSSI is above or equal to the threshold, the communication unit 113 takes no further action, and simply continues the monitor the RSSI of downlink communication signal 116. However, if the RSSI of the downlink communication signal 116 is below the threshold, the communication unit 113 transmits a request via the uplink communication signal 119, to the serving base site 101 to be handed off to an uplink/downlink channel having a less aggressive reuse pattern. By handing off the interfered with communication unit 113 to a channel having a less aggressive reuse pattern, the potential for continued cochannel/adjacent channel interference will be greatly reduced.

FIG. 3 illustrates a base site (e.g., 101) in accordance with a preferred embodiment of the present invention. The base site 101 comprises, an antenna 301, a receiver 303, a transmitter 305, a processor 307, and a database 311. The receiver 303 preferably comprises well known front-end and backend circuitry, such as downconverters, mixers, filters, demodulators, and analog-to-digital converters that produce a baseband representation of the received uplink communication signal 119. The transmitter 305 preferably comprises mixers, amplifiers, attenuators, and modulation circuitry. The processor 307 preferably comprises a DSP or a microprocessor. The database 311 preferably comprises a random access memory (RAM) that contains uplink power control parameters, such as a desired RSSI level and a signal-to-noise threshold, for the distant base sites (102–105 in FIG. 1), the transmit power of the distant base sites 102–105, and the transmit powers of the communication units (e.g., 113) that are registered for service in the base site's service coverage area (107 in FIG. 1).

In the preferred embodiment, the base site 101 receives the uplink communication signal 119, including the characteristic of signal usability for a distant base site's downlink communication signal (118 in FIG. 1), from a communication unit 113 via the antenna 301. The uplink communication signal 119 is then processed by the receiver 303 to extract the characteristic of signal usability. The processor compares the characteristic of signal usability to a usability threshold. When the characteristic of signal usability exceeds the usability threshold, the processor 307 accesses the database 311 to obtain the parameters necessary to estimate the signal-to-noise ratio at the distant base site (e.g., 105 in FIG. 1). The processor 307 estimates the signal-to-noise ratio at the distant base site 105, as discussed above with regard to FIG. 1, compares the signal-to-noise ratio to the signal-to-noise threshold for the distant base site 105 stored in the database 311, and generates a hand-off command 309 based on the comparison. When the signal-to-noise ratio is less than the signal-to-noise threshold, the hand-off command 309 instructs the communication unit 113 to hand-off to an uplink/downlink channel having a less aggressive reuse pattern, thereby reducing the interference produced by communication unit 113 as perceived by the distant base site 105. The hand-off command 309, when generated, is provided to the transmitter 305 for transmission to the communication unit 113. The transmitter 305 transmits the hand-off command 309 to the communication unit 113 via the downlink communication signal 116.

In the second alternative embodiment discussed above with regard to FIG. 2, wherein the communication unit 113 performs the comparison of the characteristic of signal usability to the usability threshold, the base site 101, upon receiving an uplink communication signal 119 that includes the characteristic of signal usability, proceeds directly with estimating the signal-to-noise ratio at the distant base site 105, comparing the signal-to-noise ratio to the signal-to-noise threshold for the distant base site 105 stored in the database 311, and generating, if necessary, the hand-off command 309 based on the comparison.

FIG. 4 illustrates a logic flow diagram 400 of steps executed by a base site and a communication unit in accordance with the preferred embodiment of the present invention. The logic flow begins at 401. Next, at 403, the communication unit is in communication with a first, or serving, base site of the communication system. That is, the communication unit is transmitting an uplink voice or data communication signal to the first base site via an uplink channel of the first communication resource and the first base site is transmitting a downlink voice, data, or control communication signal to the communication unit via a downlink channel of the first communication resource. In the preferred embodiment, the uplink and downlink channels of the first communication resource each comprises a time slot at a corresponding uplink or downlink frequency in accordance with known time division multiple access (TDMA) techniques.

While the communication unit is communicating with the first base site, the communication unit monitors (405) a downlink communication signal (e.g., a common control signal) transmitted by a second, or distant, base site. The second base site is preferably configured to receive uplink communication signals at either the same frequency as, or a frequency substantially adjacent to, the frequency of the uplink communication signal transmitted by the communication unit. Upon receiving the downlink communication signal from the second base site, the communication unit determines (407) a characteristic of signal usability for the downlink communication signal. In the preferred embodiment, this determination comprises an RSSI. The communication unit then transmits (409) the characteristic of signal usability to the first base site as part of an uplink communication signal.

Upon receiving the characteristic of signal usability from the communication unit, the first base site first compares (410) the characteristic of signal usability to a usability threshold. When the characteristic of signal usability is less than or equal to the usability threshold, the first base site takes no action and the logic flow returns to step 405. However, when the characteristic of signal usability exceeds the usability threshold, the first base site determines (411) the signal propagation loss between the second base site and the communication unit based on the characteristic of signal usability (RSSI) and the transmit power of the second base site. In a preferred embodiment, this determination is simply a subtraction of the RSSI (in dB units) of the downlink communication signal from the transmit power (in dB units) of the second base site. Upon determining the signal propagation, or path, loss between the communication unit and the second base site, the first base site uses the signal propagation loss to estimate (413) a signal-to-noise ratio at the second base site. The signal-to-noise ratio computation is described in detail above with regard to FIG. 1. The first base site then compares (415) the estimated signal-to-noise ratio to a signal-to-noise threshold for the second base site. The signal-to-noise threshold preferably comprises the minimum acceptable signal-to-noise ratio to maintain a particular signal quality. For example, in the GSM cellular system, the signal-to-noise threshold is approximately 13 dB.

In the preferred embodiment, when the signal-to-noise ratio is greater than or equal to the signal-to-noise threshold, the first base site takes no action and the logic flow returns to step 405. However, when the signal-to-noise ratio is less than the signal-to-noise threshold, the first base site generates a hand-off command instructing the communication unit to hand-off to an uplink/downlink channel having a less aggressive reuse pattern. The first base site then transmits (419) the hand-off command to the communication unit via a downlink communication signal. Upon receiving the hand-off command, the communication unit performs a hand-off (421) to the assigned uplink/downlink channel having a less aggressive reuse pattern, and the logic flow ends (417).

Figure 5:
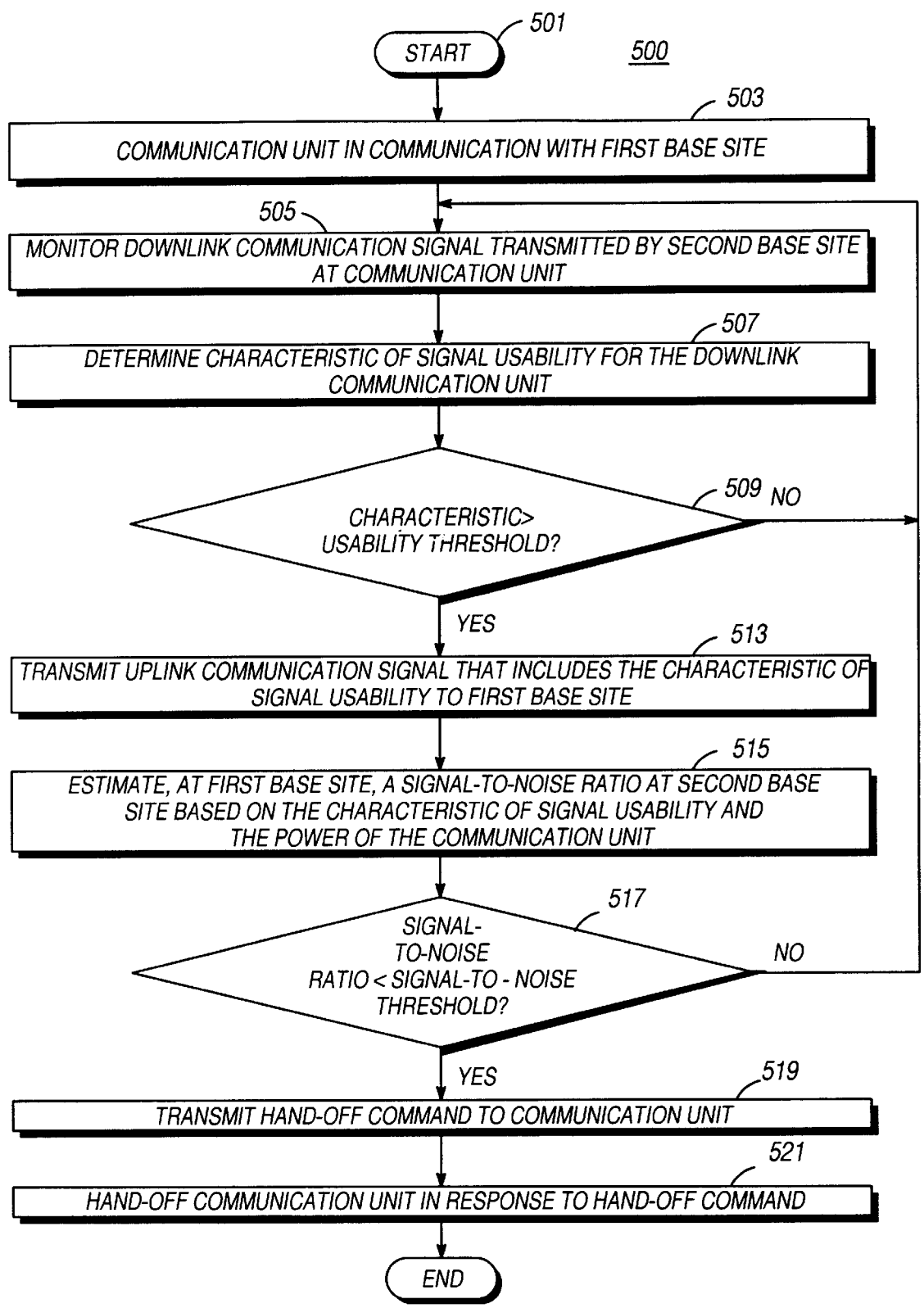
FIG. 5 illustrates a logic flow diagram of steps executed by a base site and a communication unit in accordance with a first alternative embodiment of the present invention.

FIG. 5 illustrates a logic flow diagram 500 of steps executed by a base site and a communication unit in accordance with the first alternative embodiment of the present invention. The logic flow begins (501) when the communication unit is in communication (503) with the first base site of the communication system. Similar to the logic flow of FIG. 4, the communication unit monitors (505) a downlink communication signal transmitted by a second base site and determines (507) a characteristic of signal usability for the downlink communication signal. However, in this embodiment, the communication unit compares (509) the characteristic of signal usability to a usability threshold. When the characteristic of signal usability is less than or equal to the usability threshold, the communication unit takes no further action other than simply returning to step 505.

However, when the characteristic of signal usability exceeds the usability threshold, the communication unit transmits (513) an uplink communication signal containing the characteristic of signal usability to the first base site. Then, similar to the logic flow of FIG. 4, the first base site estimates (515) the signal-to-noise ratio at the second base site based on the characteristic of signal usability and the transmit power of the communication unit, compares (517) the signal-to-noise ratio to a signal-to-noise threshold. If the signal-to-noise ratio is greater than or equal to the signal-to-noise threshold, the logic flow returns to step 505. However when the signal-to-noise ratio is less than the signal-to-noise threshold, the serving base station transmits (519) a hand-off command to the communication unit instructing the communication unit to hand-off to a particular uplink/downlink channel on a less aggressive reuse pattern. Upon receiving the hand-off command, the communication performs a hand-off (521) and the logic flow ends (511).

Figure 6:
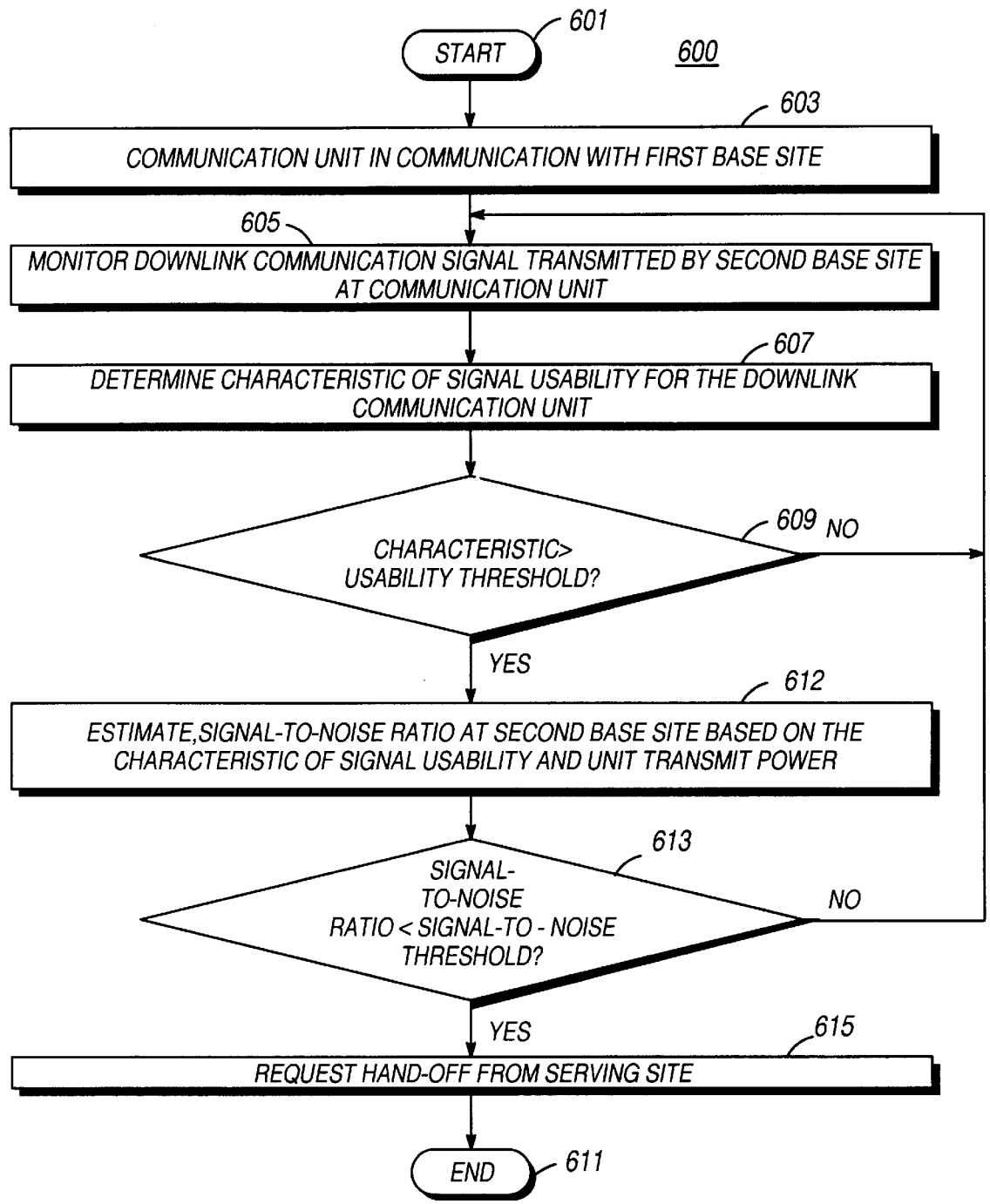
FIG. 6 illustrates a logic flow diagram of steps executed by a communication unit in accordance with a second alternative embodiment of the present invention.

FIG. 6 illustrates a logic flow diagram 600 of steps executed by a communication unit in accordance with the second alternative embodiment. The logic flow begins (601) when the communication unit is in communication (603) with a first base site of the communication system. Similar to the logic flows of FIGS. 4 and 5, the communication unit monitors (605) a downlink communication signal transmitted by a second base site and determines (607) a characteristic of signal usability for the downlink communication signal. However, in this embodiment, the communication unit performs all the functions of determining when the characteristic of signal usability exceeds the usability threshold, and then requests a hand-off from the serving base site.

Continuing, the communication unit compares (609) the characteristic of signal usability to a usability threshold. When the characteristic of signal usability is less than or equal to the usability threshold, the logic flow returns to step 605. However, when the characteristic of signal usability exceeds the usability threshold, the communication unit estimates (612) the signal-to-noise ratio at the second base site based on the characteristic of signal usability and the communication unit's transmit power, and compares (613) the signal-to-noise ratio to a signal-to-noise threshold. To facilitate this estimation and comparison, while minimizing the amount of memory necessary at the communication unit, the communication unit might request the necessary quantities (e.g., desired RSSI level, transmit power of the second base site, and signal-to-noise threshold) from the first base site's database to perform the signal-to-noise computation and comparison. Alternatively, the communication unit might maintain its own database and receive database updates from the first base site.

When the signal-to-noise ratio is greater than or equal to the signal-to-noise threshold, the logic flow returns to step 605. However, when the signal-to-noise ratio is less than the signal-to-noise threshold, the communication unit requests from the serving station, a hand-off to an uplink/downlink channel having a less aggressive reuse pattern (615), and the logic flow ends (611).

Figure 7:
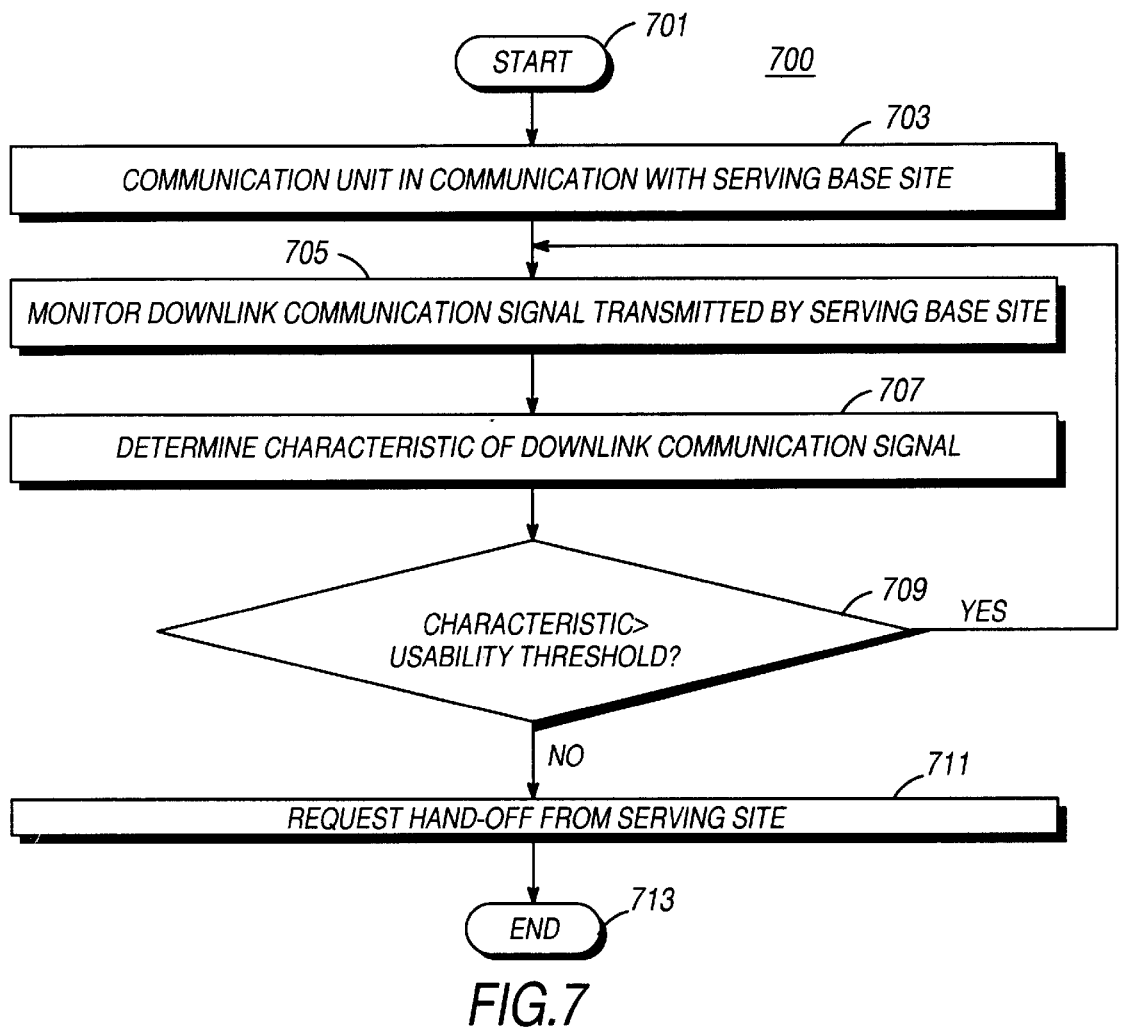
FIG. 7 illustrates a logic flow diagram of steps executed by a communication unit in a third alternative embodiment of the present invention.

FIG. 7 illustrates a logic flow diagram 700 of steps executed by a communication unit in the third alternative embodiment of the present invention. The logic flow begins at 701, where the communication unit is in communication (703) with the serving base site. In this embodiment, the communication unit monitors (705) a the downlink communication to determine a characteristic (707) of the of the downlink communication signal transmitted by the serving base site. In the preferred embodiment this characteristic comprises a received signal strength indication (RSSI). However, in an alternate embodiment the characteristic might be related to a bit error rate (BER), a frame erasure rate (FER), a carrier to interference ratio (C/I), or a carrier to noise ratio (C/N). Next, the communication unit compares the RSSI to a threshold (709). If it is determined that the RSSI is above or equal to the threshold, the logic flow returns to step 705. However, if the RSSI of the downlink communication signal is below the threshold, the communication unit transmits a request (711) to the serving base site to be handed off to an uplink/downlink channel having a less aggressive reuse pattern, thereby reducing the interference produced by the interfering communication unit as perceived by the distant base site. The logic flow ends at 713.

Figures 8A, 8B:
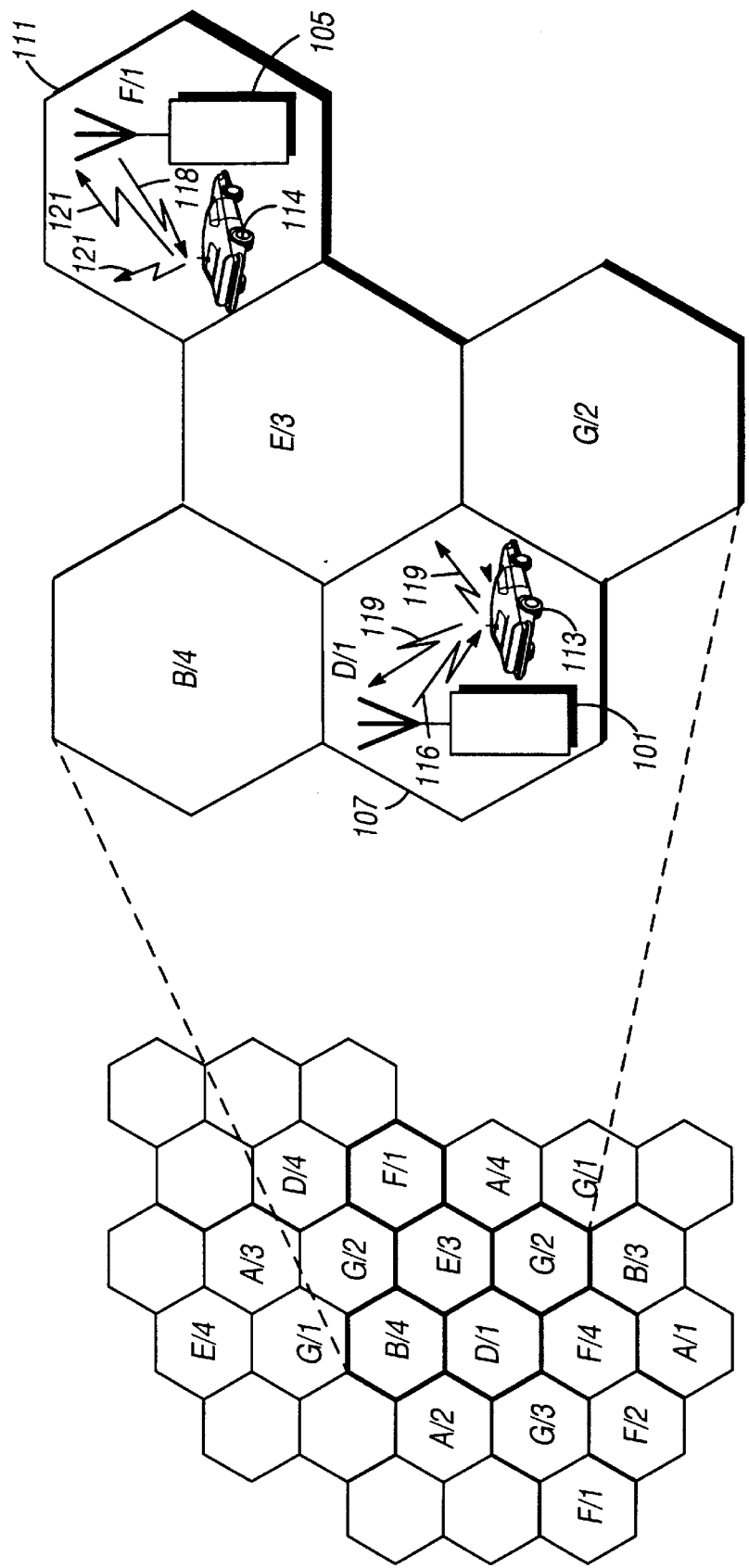
FIGS. 8A and 8B illustrate a cellular coverage area using simultaneous multi-level reuse patterns in accordance with a preferred embodiment of the present invention.

FIGS. 8A and 8B illustrate a cellular coverage area using simultaneous multi-level reuse patterns in accordance with a preferred embodiment of the present invention. The cellular coverage area includes a plurality of base sites 101 and 105 having respective service coverage areas 107 and 111 and a plurality of communication units 113 and 114. As shown, communication unit 113 is communicating with base site 101 via uplink communication signal 119 and base site 101 is communicating with communication unit 113 via downlink communication signal 116. Similarly, communication unit 114 is communicating with base site 105 via uplink communication signal 121 and base site 105 is communicating with communication unit 114 via downlink communication signal 118.

For simplicity, the base sites shown in FIGS. 8A and 8B are not sectorized, but one of ordinary skill in the art will recognize that one site commonly has up to six 60 degree sectors. In the preferred embodiment, each site operates on both a four site reuse pattern and a seven site reuse pattern, whereby one set of channels (1–4) is dedicated to the four site reuse pattern while another set of channels (A–F) is dedicated to the seven site reuse pattern. One of ordinary skill in the art will recognize that many differing reuse patterns are equally suitable to the method of the invention described herein.

Continuing, base site 101 is capable of communicating on those channels associated with groups D and 1, and base site 105 is capable of communicating on those channels associated with groups F and 1. As shown in FIGS. 8A and 8B, communication unit 113 is communicating with base site 101 on a particular uplink/downlink channel belonging to group 1, while communication unit 114 is communicating with base site 105 on the same (or adjacent) uplink/downlink channel as that of communication unit 113. Typically, as communication unit 113 moves to the periphery of the serving base site coverage area 107, the transmit power of the communication unit 113 as well as the transmit power of the base site 101 must be increased to account for an increase in path losses between the serving base site 101 and the communication unit 113. This increased transmit power has the potential to interfere with the same (or adjacent) uplink/downlink frequency being used by communication unit 114. That is, the higher power transmission of communication unit 113 and base site 101 can increase the cochannel or adjacent channel interference in coverage area 111 as viewed by communication unit 114.

Once it has been determined that communication unit 113 is a potential interferer to communication unit 114, base site 101 transmits a hand-off command to communication unit 113 that directs communication unit 113 to hand-off to an uplink/downlink channel associated with group D. Since base site 105 does not operate with channels belonging to group D, the interference produced by communication unit 113 as perceived by the distant base site 105 (and similarly, all sites utilizing group 1 channels) has been reduced.

The descriptions of the invention, the specific details, and the drawings mentioned above, are not meant to limit the scope of the present invention. For example, in addition to handing off communication units that are potential interferes to channels having a less aggressive reuse pattern, users that are experiencing no interference and are on a less aggressive pattern may be handed off to the more aggressive pattern. It is the intent of the inventors that various modifications can be made to the present invention without varying from the spirit and scope of the invention, and it is intended that all such modifications come within the scope of the following claims.

What is claimed is:

1. A method for maintaining call quality in a communication system, comprising the steps of:
    communicating between a first site and a communication unit on a first channel, the first channel associated with a first group of channels, said first channel associated with a first identification number;
    monitoring by the communication unit, a second channel transmitted from a second site;
    estimating a signal quality as viewed by the second site for an uplink communication signal transmitted by a second communication unit by subtracting a signal power of the first channel from a desired signal quality value for the uplink communication signal transmitted by the second communication unit; and
    transferring the communication unit to a third channel based on the estimated signal quality, the third channel associated with a second group of channels having a less aggressive reuse pattern than the first group of channels.

2. The method of claim 1 wherein the first identification number corresponds to a particular frequency of a communication system.

3. The method of claim 1 wherein the first identification number corresponds to a particular frequency and time slot of a communication system.

4. A method for maintaining call quality in a cellular system, comprising the steps of:
    communicating between a first base site and a mobile unit on a first channel, wherein the first channel resides in a first group of channels, said first channel associated with a first identification number;
    monitoring by the first base site, a second channel transmitted from a second base site, wherein the second channel resides in the first group of channels;
    determining by the first base site, a characteristic of the second channel;
    estimating a signal quality as viewed by the second site for an uplink communication signal transmitted by a second communication unit by subtracting a signal power of the first channel from a desired signal quality value at the second base site; and
    handing off the mobile unit to a third channel based on the characteristic of the second channel, and the estimated signal quality, wherein the third channel resides in a second group of channels said second group of channels having a less aggressive reuse pattern than the first group of channels.

5. The method of claim 4 wherein the first identification number corresponds to a particular frequency of a communication system.

6. The method of claim 4 wherein the first identification number corresponds to a particular frequency and time slot of a communication system.

7. The method of claim 4, wherein the step of determining the characteristic of the second channel comprises the step of determining a received signal strength indicator (RSSI) of the second channel.

8. The method of claim 4, wherein the step of determining the characteristic of the second channel comprises the step of determining a bit error rate (BER) of the second channel.

9. A method of mitigating interference in a cellular system, comprising the steps of:
    communicating between a first site and a communication unit on a first channel, the first channel associated with a first group of channels;
    monitoring by the communication unit, a characteristic of the first channel;
    comparing the characteristic of the first channel to a threshold;
    estimating a signal quality as viewed by a second site for an uplink communication signal transmitted by a second communication unit when the comparison exceeds the threshold, the estimation made by subtracting a signal power of the first channel from a desired signal quality value for the uplink communication signal transmitted by the second communication unit; and
    transferring the communication unit to a second channel based on the characteristic, the comparison and the estimated signal quality, the second channel associated with a second group of channels having a less aggressive reuse pattern than the first group of channels.

10. The method of claim 9, wherein the step of monitoring comprises the step of monitoring a received signal strength indicator (RSSI).

11. The method of claim 9, wherein the step of monitoring comprises the step of monitoring a bit error rate (BER).

12. A mobile unit capable of mitigating interference, comprising:
    a transmitter for transmitting to a first site on a first channel, wherein the first channel associated with a first group of channels;
    a receiver coupled to the transmitter, for monitoring a second channel transmitted from a second base site, the second channel associated with the first group of channels;
    a processor for determining a characteristic of the second channel and estimating a signal quality as viewed by the second site for an uplink communication signal transmitted by a second communication unit by subtracting a signal power of the first channel from a desired signal quality value at the second base site; and
    means for handing over the mobile unit to a third channel based on the characteristic of the second channel and the estimated signal quality, the third channel associated with a second group of channels having a less aggressive reuse pattern than the first group of channels.

* * * * *